US007886454B2

(12) United States Patent
Barneman et al.

(10) Patent No.: US 7,886,454 B2
(45) Date of Patent: Feb. 15, 2011

(54) ELEVATOR HOISTWAY INSTALLATION GUIDE SYSTEMS, METHODS AND TEMPLATES

(75) Inventors: Hakan Barneman, Solna (SE); Scott Boucher, Rowlett, TX (US); Angelika Osbon, Allen, TX (US)

(73) Assignee: Kone Corporation, Helsinki (FI)

( * ) Notice: Subject to any disclaimer, the term of this patent is extended or adjusted under 35 U.S.C. 154(b) by 219 days.

(21) Appl. No.: 12/347,664

(22) Filed: Dec. 31, 2008

(65) Prior Publication Data

US 2010/0163349 A1 Jul. 1, 2010

(51) Int. Cl.
*G01B 5/25* (2006.01)

(52) U.S. Cl. .......................................... 33/562; 33/645

(58) Field of Classification Search .................. 33/562, 33/563, 613, 645

See application file for complete search history.

(56) References Cited

U.S. PATENT DOCUMENTS

| | | | | |
|---|---|---|---|---|
| 4,819,403 | A | 4/1989 | Penicaut et al. | |
| 5,065,843 | A | 11/1991 | Richards | |
| 5,799,405 | A * | 9/1998 | Christensen et al. | 33/645 |
| 6,874,244 | B2 * | 4/2005 | Birrer et al. | 33/708 |
| 7,137,485 | B2 | 11/2006 | Barneman et al. | |
| 7,537,092 | B2 * | 5/2009 | Birrer et al. | 33/706 |
| 7,562,747 | B2 * | 7/2009 | Marchesi | 187/391 |
| 2009/0041879 | A1 * | 2/2009 | Baum et al. | 33/286 |

FOREIGN PATENT DOCUMENTS

| | | | |
|---|---|---|---|
| GB | 2 260 963 | A | 5/1993 |
| JP | 61-121838 | | 6/1986 |

OTHER PUBLICATIONS

PCT/US2009/069806; International Search Report, Dec. 30, 2009; pp. 1-5.
PCT/US2009/069806; Notification of Transmittal of the International Search Report and the Written Opinion of the International Searching Authority, or the Declaration, Dec. 30, 2009; pp. 1-3.
PCT/US2009/0698806; Written Opinion, Dec. 30, 2009; pp. 1-9.
PCT/US2009/069806; International Search Report, Mar. 17, 2010; pp. 1-7.

* cited by examiner

*Primary Examiner*—G. Bradley Bennett
(74) *Attorney, Agent, or Firm*—Birch, Stewart, Kolasch & Birch, LLP

(57) ABSTRACT

A template for accurately positioning structural components of elevator(s) in a elevator hoistway(s), or of elevator hoistway walls or partitions in a building, includes a thin, flexible sheet of material adapted to be placed on a floor of elevator hoistway(s), has indicia on the flexible sheet of material to show locations, and points of attachment, of elevator structural components which are to be installed in the elevator hoistway(s). Tensioning elements attachable to the flexible sheet of material may be used to square up the flexible sheet of material. The template may be made by forming a thin, flexible sheet of material, providing indicia on the flexible sheet of material, and by providing tensioning elements to square up the flexible sheet of material. The flexible template may be placed on the floor of the elevator hoistway(s), squared, and the squared up template used as a guide to install the major elevator structural components. The template may, alternatively, be made of a substantially rigid, e.g., corrugated, sheet material and employ interconnected sections.

17 Claims, 9 Drawing Sheets

ELEVATOR HOISTWAY INSTALLATION GUIDE SYSTEMS, METHODS AND TEMPLATES

BACKGROUND OF THE INVENTION

1. Field of the Invention

The present invention relates to an elevator installation procedure, system, and template for use in the installation of an elevator.

2. Description of Background Art

Elevators normally operate by means of an elevator car moving in a vertical direction in an existing hoistway or elevator shaft. Many elevator shafts are built of concrete masonry units. Guide rails for the elevator car and a counterweight are typically fixed to the shaft walls using rail fixtures. During the installation of the elevator, the guide rails and other shaft equipment are adjusted to their proper positions. In this context, shaft equipment refers to guide rails, landing doors and their mounting brackets. In the vertical direction, alignment of the guide rails and other elevator elements is achieved using plumb lines, which are fixed at a point above the shaft equipment to be installed in the elevator shaft and which extend through the whole length of the shaft. It has also been suggested that the alignment could be done using a laser beam, but this method may not be used due to costs and difficult conditions at the site of an elevator installation. Various prior art alignment devices have been employed, including those described, as follows:

U.S. Pat. No. 4,819,403 to Penicaut et al. discloses a method for installing a hall door assembly on a floor when the elevator rails or car are not installed during early construction stages of a building which has an existing elevator hoistway/elevator shaft. According to Penicaut et al.'s background art, first the elevator drive is installed in the elevator machine room, which may be on the top, side or bottom of the shaft. Then the elevator guide rails are installed by using a template, which is temporarily placed in the shaft, to align the rails relative to the drive. Then, using the elevator rails and another template, the hall door is installed by aligning it with location marks on the template. Penicaut's invention concerns installing a door in a partially completed building and uses a template placed in an elevator shaft at the machine room, the template being keyed to the dimensions of the shaft and identifies the correct location on the elevator shaft wall for brackets 22 and/or 24. A stated object of Penicaut et al. is to identify the correct location for the bracket for the location of the rails, which are installed, along with the elevator car, after the hall door is initiated.

U.S. Pat. No. 5,065,843 to Richards discloses a method for installing elevator system components in a building with an existing elevator hoistway/elevator shaft, in which a working platform that is shown in detail in FIGS. 4 and 5, for example, is set up on the highest floor slab in a building being erected so as to cover the elevator hoistway. The platform serves as a template for rail plumb lines and landing door assemblies, and carries winches which are used to lift the rails and door assemblies into place in the hoistway. Richards involves use of a costly template is employed only when the upper floors of a building are in place.

GB 2,260,963 to Pearce discloses a method of checking the vertical alignment of an elevator guide rail in an existing elevator hoistway/elevator shaft employing a target fixed to an upper region of a guide rail that is used in conjunction with a laser theodolite mounted on the roof of an elevator car. Pearce is limited to adjusting alignment of elevator car rails that are already in place.

U.S. Pat. No. 7,137,485 to Barneman et al. discloses a system and method for plumbing the equipment in an existing elevator hoistway/elevator shaft to their proper positions by mounting a plumbing jig in the elevator shaft, the step of mounting being carried out from the top floor and the plumbing jig being below the top of the elevator shaft; attaching plumb lines from the plumbing jig, the plumb lines being attached from the top floor, positioning various pieces of shaft equipment using the plumb lines attached to the plumbing jig; and fixing the various pieces in place after the step of positioning. The apparatus of the invention comprises support elements fixable to the elevator shaft, a plumbing jig attachable to the support elements and mountable substantially from the top floor, plumb lines suspendable from the plumbing jig and, when suspended from the plumbing jig, the plumb lines extend into the elevator shaft below the plumbing jig and are used to align at least one guide rail. Barneman involves use of a plumbing jig where the upper floors of a building are already in place.

The prior art is directed to existing elevator hoistways/elevator shafts. The systems, methods and templates of Applicants' disclosed invention are, however, directed to use with building elevator hoistways/elevator shafts or with elevator hoistways/elevator shafts that have already been constructed in whole or in part.

SUMMARY OF THE INVENTION

One object of the systems, methods and templates of the invention is to provide relatively inexpensive systems and methods and templates for use therein which permit accurate installation of the components of an elevator hoistway/elevator shaft in a building where the elevator hoistway/elevator shaft has not been constructed and/or where an elevator hoistway/elevator shaft that has been at least partially constructed.

Another object of the systems, methods and templates of the invention is to employ templates which are recyclable.

Another object of the systems, methods and templates of the invention is to provide a template that permits a user of the invention to work in a building without an elevator hoistway or elevator shaft, or with an elevator hoistway or elevator shaft, to provide templates to establish a plumbing diagram for structural components of the elevator hoistway, those structural components including, but not limited to, elevator car and counterweight guide rails, elevator car and counterweight safety elements, plumb wire and/or laser positions, landing door opening positions, elevator car opening positions, elevator car and counterweight safety gear arm pickup location(s), rope compensator guide rail bracket locations and wall drilling positions, elevator car and counterweight guide rail bracket locations and wall drilling positions, dimensions of all structural components, pit ladders, ducts (for electrical cables, electrical buffer contacts, roping cables, air conditioning, etc.), counter weights, car buffers, counterweight buffers, landing door positions, and drilling positions for all structural components, hoistway wall locations, and building insert locations.

Another object of the systems, methods and templates of the invention is to provide a single template made of one or more different materials.

Another object of the systems, methods and templates of the invention is to provide templates for a plurality of elevators, which may be refereed to, for example, as a multiplex arrangement of elevators, so that the plural elevators may be aligned to the same building datum lines by aligning plural templates with one another by use of a laser or a wire located across the front of a hoistway.

Another object of the systems, methods and templates of the invention is to locate and/or reference plumb lines and/or plumb bobs, and/or light sources, including for example, lasers, to predetermined indicia and/or locations on the templates.

Another object of the systems, methods and templates of the invention is to affix a template to the elevator pit floor during installation of the elevator structural components and remove the template for recycling during or after installation of the structural components.

Another object of the systems, methods and templates of the invention is to provide suitably tensioned flexible templates with accurate measurement indicia so as to permit consistently accurate plumbing of elevator hoistway or elevator shaft structural components.

Another object of the systems, methods and templates of the invention is to provide systems, methods and templates that may be used with conventional art systems and methods for elevator structural component installation, and may be used without using scaffolds.

Another object of the systems, methods and templates of the invention is to provide templates with features that employ tensioning elements of a variety of materials including, for example, steel spring material and/or glass fiber material, and fasteners that include adhesives, plugs, rivets, anchors, nails and washers.

Another object of the systems, methods and templates of the invention is to provide templates having a cross-sectional geometric shape that is suitable to the cross-sectional geometric shape of an elevator hoistway to be constructed, or that is already constructed to some degree. Exemplary template cross-sectional shapes may include rectangles, ovals, and circles, but are not limited to those exemplary shapes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following disclosure, various exemplary embodiments of the systems, methods and templates of the invention will be described with reference to the attached drawings, which are given by way of illustration only, and thus are not limitative of the present invention, and in which.

DETAILED DESCRIPTION OF THE EXEMPLARY EMBODIMENTS

In various exemplary embodiments, the template may be made of a wide variety of flexible materials including, for example, rip-stop nylon, plastic sheeting, cloth sheeting, canvas, metal, paper, cardboard, leather, connected portions which are foldably or hingedly expandable, combinations of the aforementioned materials such as, plastic coated thin metal sheet material.

The template may include tensioning elements, including, for example, rods or strips which are fastened to opposing sides and/or corners of the template to keep the template flat against the bottom floor of the elevator pit. These tensioning elements may be removably attachable to and detachable from the template by, for example, sheaths or catches. The template itself may include one or more grommets located at or near sides and/or corners of the template to fasten the template to the elevator pit floor. Many different types of fasteners may be used to attach the tensioning elements to the template and the template to the elevator pit floor including, for example, metal or plastic anchors. In fact, the tensioning elements may be connected through the template and into the elevator pit floor. Suitable reinforcing elements such as washers may be used to reduce the chance that a fastener will be damaged and the template come loose.

In other exemplary embodiments, templates may be rigid to keep their shape when supported by the floor of an elevator hoistway. A template itself may be rigid or the template may have a rigid component and a flexible component. If the template has both a rigid component and a flexible component, the rigid component may be placed above or below the flexible component, or may be inserted partially or completely inside of the flexible template component. If placed above the flexible component, the rigid component will be transparent in the areas where the indicia for the support elements, anchors, etc, are located. If a template has both a rigid component and a flexible component, tensioning elements may be included for squaring the flexible component.

Figure 1:
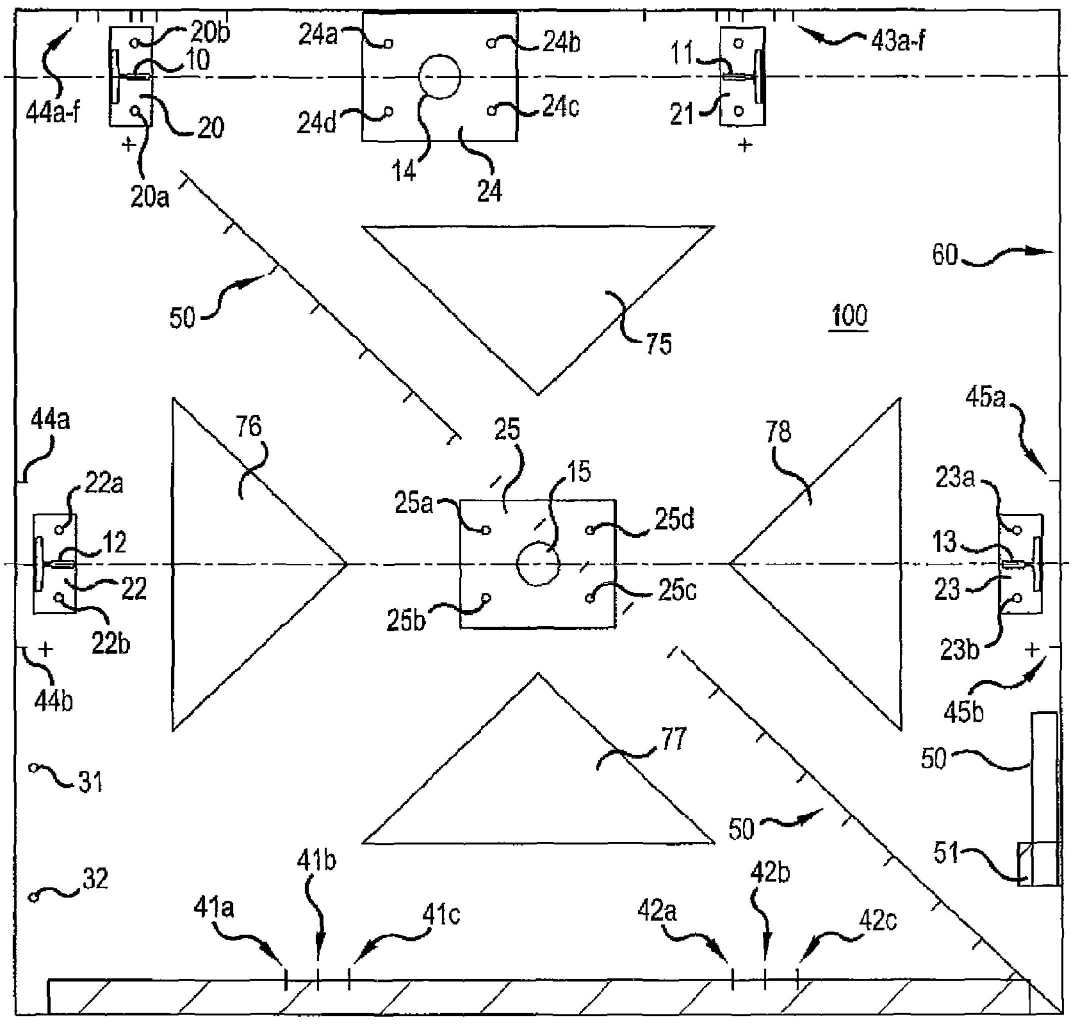
FIG. 1 is a plan view of elevator structural element installation location indicia on an elevator structure installation template according to the invention.

FIG. 1 shows a plan view of an exemplary embodiment of a template 100 according to the invention which includes indicia of a number of structural elements of an elevator system with respect to which the template 100 is designed to be used to facilitate accurate and proper installation of such structural components. In FIG. 1, indicia 10 and 11 show outlines of counterweight guide rails, and indicia 20 and 21 show outlines of counterweight guide rail floor brackets, with associated fixing or attachment or anchor hole indicia 20*a*, 20*b*, 21*a* and 21*b*. The template 100 also shows counterweight guide rail wall bracket fixing or attachment or anchor hole location indicia 43*a*-43*f* and 44*a*-44*f*. Counterweight guide rail wall brackets are to be installed at one or more locations along the height of counterweight guide rails to support the counterweight guide rails.

Template 100 also contains indicia for counterweight buffer 14 and counterweight buffer support bracket 24 and for fixing or attachment or anchor positions within that bracket. Template 100 also shows indicia for elevator car buffer 15 and elevator car buffer support bracket 25 and for fixing or attachment or anchor positions within that bracket.

Template 100 also contains indicia 31 and 32, each of which may locate an over speed governor rope position, or a tension weight placement.

Template 100 also contains landing door sill position and clear opening position fixing or attachment or anchor positions 41*a*-41*c* and 42*a*-42*c*.

Template 100 also includes measurement indicia 50 showing the location of a pit ladder, and indicia 51 showing the location of a duct for electrical cables, refrigerant lines, or other elongated elements.

Template 100 also shows locations for attaching over speed governor/rope position/tension weight placement to the elevator pit floor.

Template 100 of FIG. 1 also shows landing door sill position and clear opening position bracket anchor locations.

On template 100, indicia 12 and 13 show outlines of elevator car guide rails, and indicia 22 and 23 show outlines of elevator car guide rail floor brackets, with associated fixing or attachment or anchor hole indicia 22*a*, 22*b*, 23*a* and 23*b*. The template 100 also shows elevator car guide rail wall bracket fixing or attachment or anchor hole location indicia 44*a*-44*b* and 45*a*-45*b*. Elevator car guide rail wall brackets are to be installed at one or more locations along the height of elevator car guide rails to support the elevator car guide rails. It is also noted that each elevator car guide and each counterweight guide may be fixed to the elevator pit floor and the elevator shaft side walls using a single right angle bracket that connects to both the floor and a side wall.

Template 100 also shows a hoistway inner perimeter line 60.

Template 100 also shows cutouts 75, 76, 77 and 78 in which a template user or construction worker can stand to maneuver the template and install and set it up properly.

The indicia shown on template 100 also shows counterweight guide rail alignment reference points 55 and 56, and elevator car guide rail alignment tool reference points 57 and 58, in addition to a centerline 80 of a counterweight rail, and a centerline 70 of an elevator car rail Template 100 may also be used to locate, for example, corner posts, side posts, elevator car slings, hydraulic jack elements (including a jack hole and reservoir), elevator gate location, pit channels, rail clip locations, etc.

Figure 3:
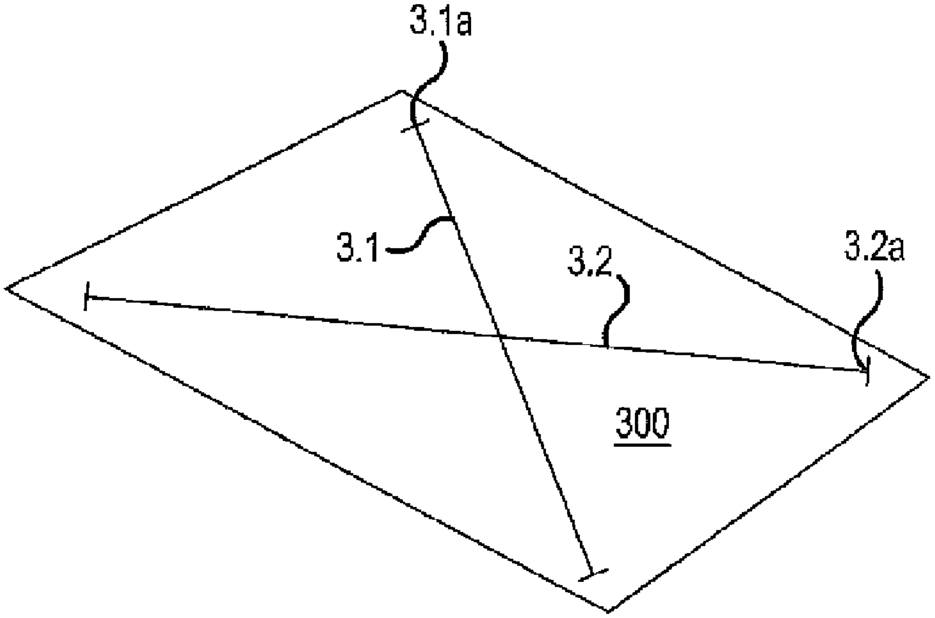
FIG. 3 is a plan view of a template with cross measuring indicia.

The flexible template 300 of FIG. 3 shows diagonal lines which may be used to check that the dimensions shown on the template installed in an elevator pit are accurate. If, for example, a ruler is applied to the straight lines shown on the template and the dimensions shown on the template to not match the dimensions shown on the straight edge, for example, the tensioning elements of the template can be adjusted until the dimensions on the template and on the straight edge match or, until there is a consistent difference between them to permit one to make an accurate measurement using the template.

Fasteners 550 or 560 may be drilled into or shot into the floor of the elevator pit, or the walls of the elevator shaft, or may be fastened to the floor of the elevator pit by adhesives, or any other suitable fastener.

After the template 100 has served its purpose, it may be removed and, if flexible, be rolled up or folded, or if articulated, be folded along hinged portion(s) thereof.

Alignment of the structural elements is achieved through normal optical and mechanical geometric alignment devices and system using the indicia/marking, holes, gaps, etc. in the template 100 as reference marks. Alignment aids, including, for example, targets, such as, for example, optical fiducial/reference markers, can be provided in, on or above the template 100 to facilitate the conventional alignment methods.

Guidance, including marks or gaps or holes or slits, for example, for locating one or more conventional alignment devices on, or adjacent to, the template 100 may also be provided.

The guidance marks associated with the template 100 may comprise attachments, printed or painted indicia, holes, gaps, slits, recesses, indentations, bosses, lips, protrusions, etc.

In one exemplary embodiment according to the invention, the template 100 may be made of rip-stop nylon with corner metal grommets, and pockets adjacent each of the four corners (may be more or fewer corners) that receive articulated metal tensioning strips made of spring steel that snap into a straight line when extended, and have expanding telescoping elements that can be locked into a variety of positions to smooth out the template and keep it in a set position for a period of time. Ruler indicia 50 are also located diagonally and rectangularly on the template 100 to serve as a check concerning the accuracy of the template's dimensions when deployed/unfurled.

Figure 2A:
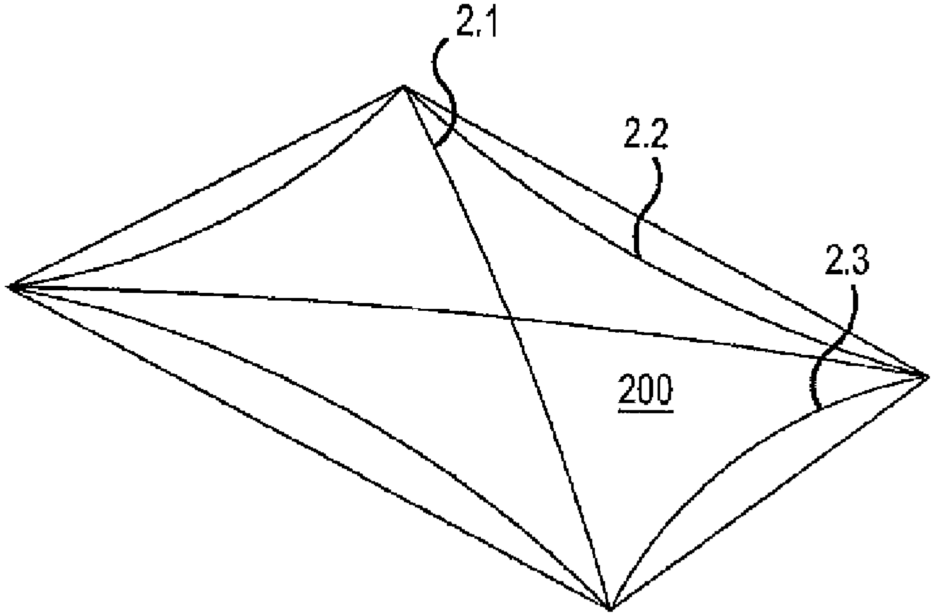
FIGS. 2A and 2B are views of elevator structure installation templates laid flat with tensioning elements.
Figure 2B:
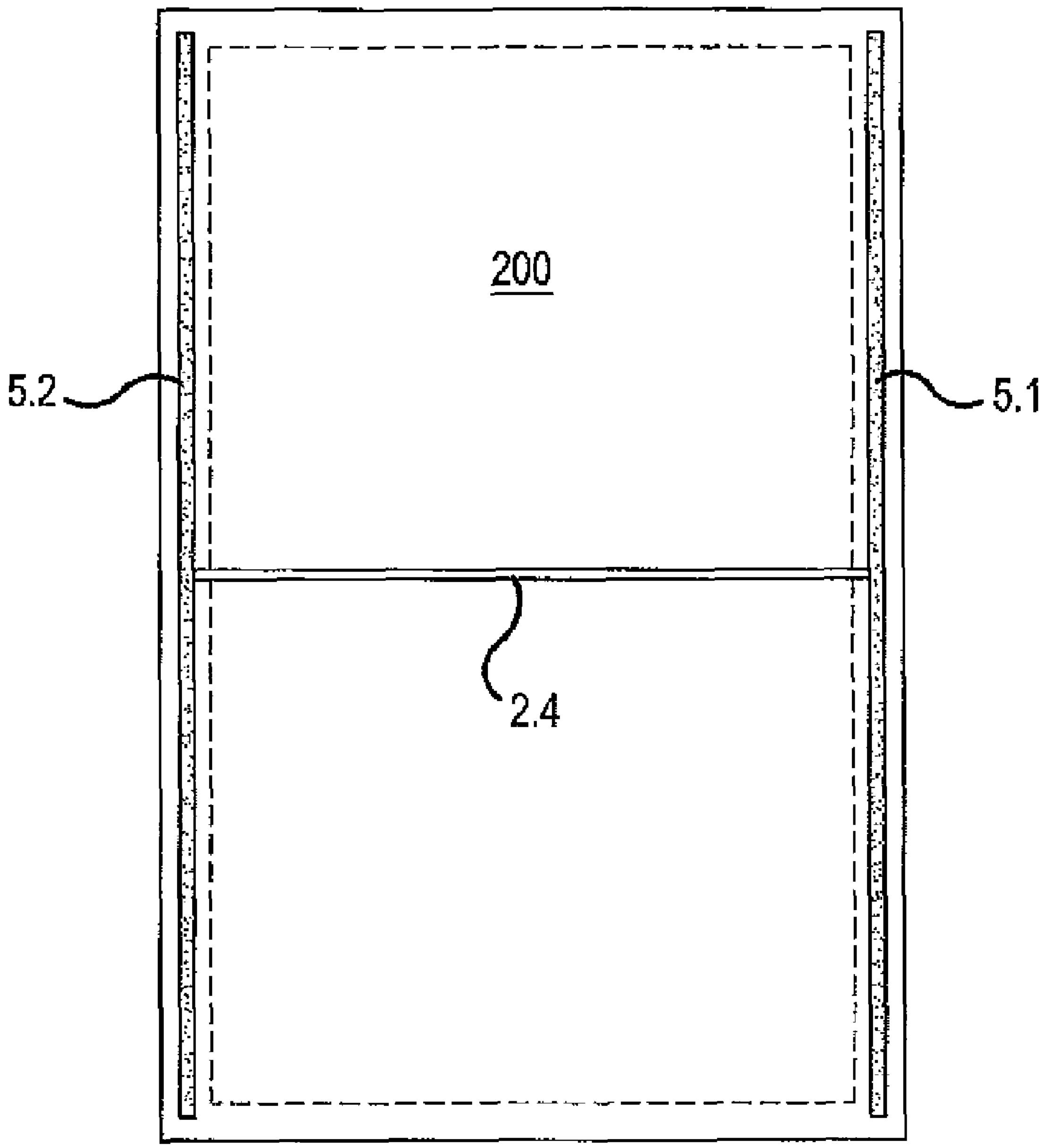

As shown in FIGS. 2A and 2B, there are a number of distinct orientations of tensioning elements in template 100, not all of which may be needed in a particular installation, and additional orientations may also be provided, e.g., located around the perimeter, or within a pocket around the perimeter of the template 100. Tensioning element orientation 2.1 is diagonally across the template 100. In FIG. 2A, tensioning element orientation 2.2 is being curvedly adjacent to a long side edge of the template. Tensioning element orientation 2.3 is being curvedly adjacent to a short side of the template. A fourth tensioning element orientation 2.4 is being located in a pocket that runs parallel to outer side edge of the template 100. Tensioning elements 2.4 may be rigid and may be separated by resilient tensioning elements or longitudinally adjustable tensioning elements.

As shown in FIG. 2B, template 100 may have rigid elements 5.1 and 5.2 running along each outer side, e.g., being fitted inside of tubular edges to contain the rigid elements, e.g., flat strips or rods, and these rigid perimeter elements may separated by one or more tensioning element(s) 2.4 that may be located within or on an outer side of the template 100 keeping rigid elements 5.1 and 5.2 apart.

FIG. 3 shows a template 300 that includes tensioning elements 3.1 and 3.2, the ends of which are attached at attachment elements 3.1*a* and 3.2*a*, respectively.

Figure 4A:
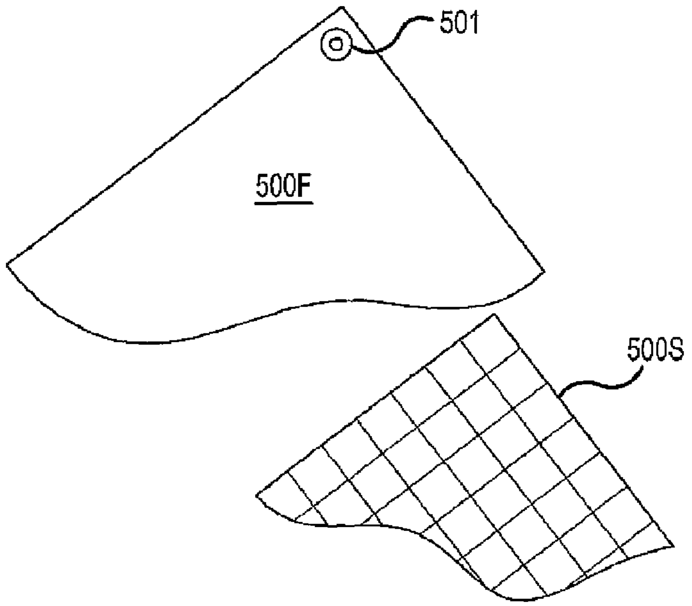
FIGS. 4A-4E present perspective views of a template showing a number of template component parts.

FIG. 4A shows a template 100 having a flexible template component 500F and a rigid template support element 500S. A grommet 501 is shown in a corned of the flexible template.

Figure 4B:
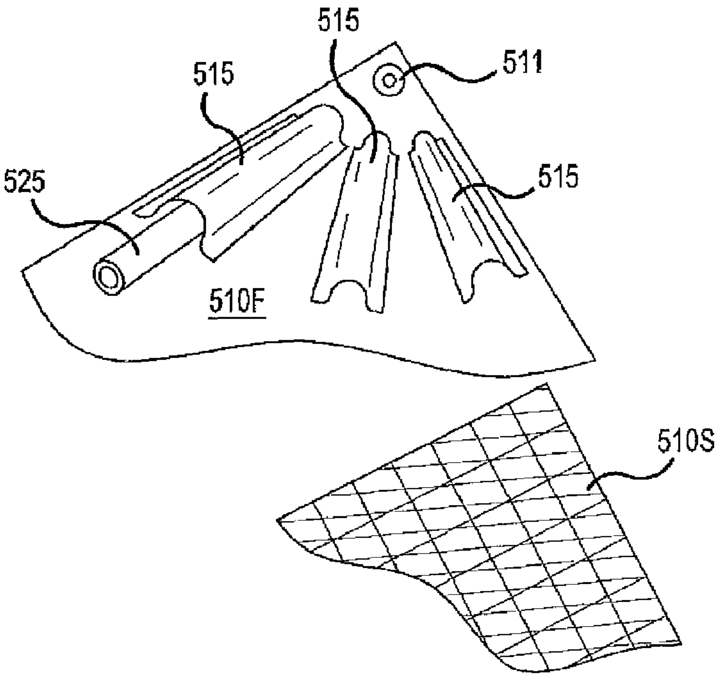

FIG. 4B shows a template 100 having a flexible component 510F, a grommet 511, and pockets 520 for holding tensioning elements 525. A rigid solid template 510 S is also shown.

Figure 4C:
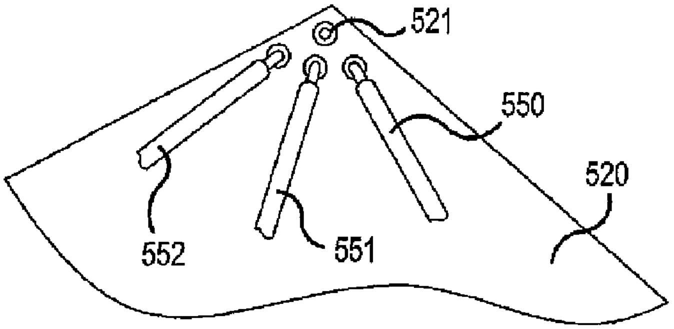

FIG. 4C shows a template 100 having a flexible component 520 and provided with tensioning elements 550.

Figure 4D:
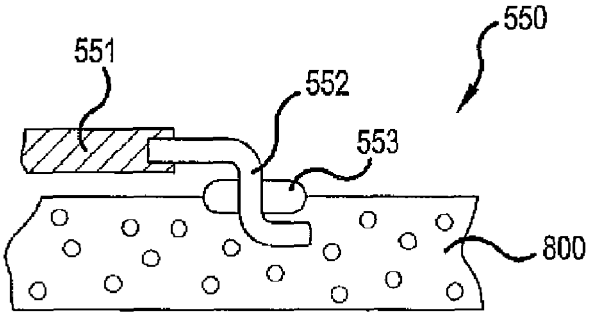

FIG. 4D shows details of tensioning element 550, which has a tensioning rod 551 attached to a tensioning rod anchor 552, which is anchored into the elevator hoistway floor 800 and extends through a grommet 553.

Figure 4E:
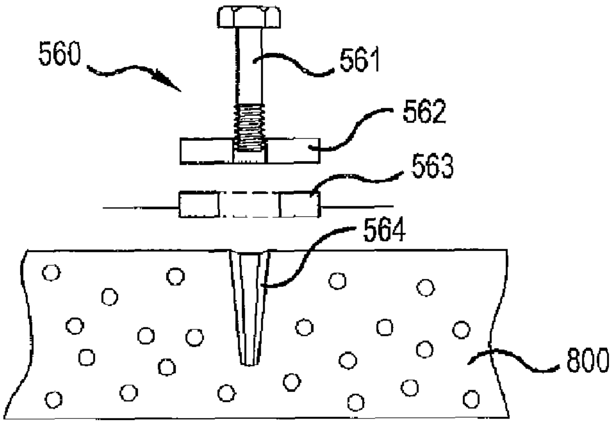

FIG. 4E shows an exploded view of exemplary anchor that is used to attach a template 100, whether it be wholly flexible, wholly rigid, of a combination of flexible and rigid template components, to the floor 800 of a hoistway. The fastener has a threaded bolt or screw 561, a washer 562, a grommet 563 and an anchor 564, which is located in the floor 800.

In various exemplary embodiments, the indicia on the template(s) may contain fluorescent or phosphorescent material, e.g., ink, or a contrasting color (chromatic or achromatic) and/or the template may contain illumination devices, e.g., light emitting diodes and diode arrays. The indicia may include measurement gradations and may mimic on a 1:1 scale, the hoistway size and exact locations of all components to be installed, including, for example, guide rails, guide rail brackets and/or plates, pit ladder(s), duct(s) for air, cables, etc., tension weight(s), elevator car and counterweight buffers, hydraulic elevator components, e.g., piston(s), landing door positions, fastening positions for all structural components. In exemplary embodiments in which the template has rigid areas, the indicia may be etched in the rigid areas.

The template 100, which is flexible or foldable, even though it may contain rigid areas or inserts, is squared up, i.e., straightened and/or flattened so that indicia on the template 100 will have accurate dimensions and be accurately positioned and orientated on the template and not skewed, using tensioning elements and may also include rigid edge elements, for example, rods of different geometric cross-section. Gradations 50 are located on the template 100 to serve as a reference check that the template 100, when squared up, as defined above, has the correct dimensions displayed for the hoistway elements depicted thereon or therein.

Once the template 100 is properly squared up, as explained above, lasers and/or plumb bobs are then located/referenced with respect to the structural component indicia located on the template 100 to permit accurate installation of the structural components.

The template 100 may be provided with one or more cutouts 75-78 to enable a user to stand in while on the floor of the hoistway and maneuver the template 100 within the hoistway to adjust the template 100 to its desired position.

Methods of making templates according to certain exemplary embodiments of this invention include forming a sheet of flexible material, such as, for example, canvas, plastic polymer, including polyester polymer, printing indicia therein using a suitable printing technique such as, for example, silk screen, intaglio, ink jet, or xerographic printing techniques, and stenciling. A rigid structure may be inserted in, or attached to the flexible film to help it maintain its shape. Where the rigid structure is positioned on the template, it should be transparent.

Figure 5A:
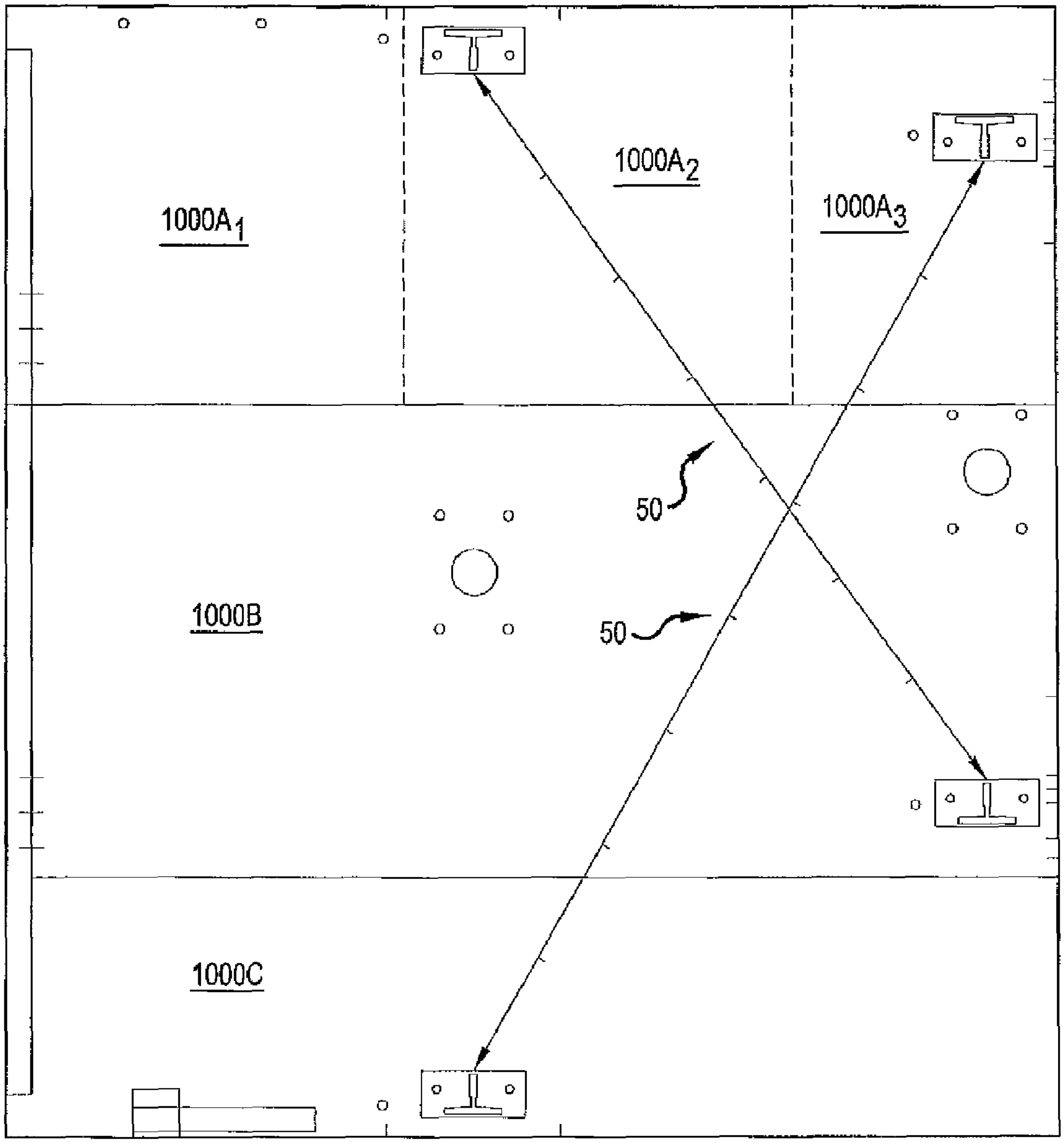
FIG. 5A shows a highly schematic plan view of an exemplary embodiment of an elevator installation template which employs rigid corrugated sheet material.
Figure 5B:
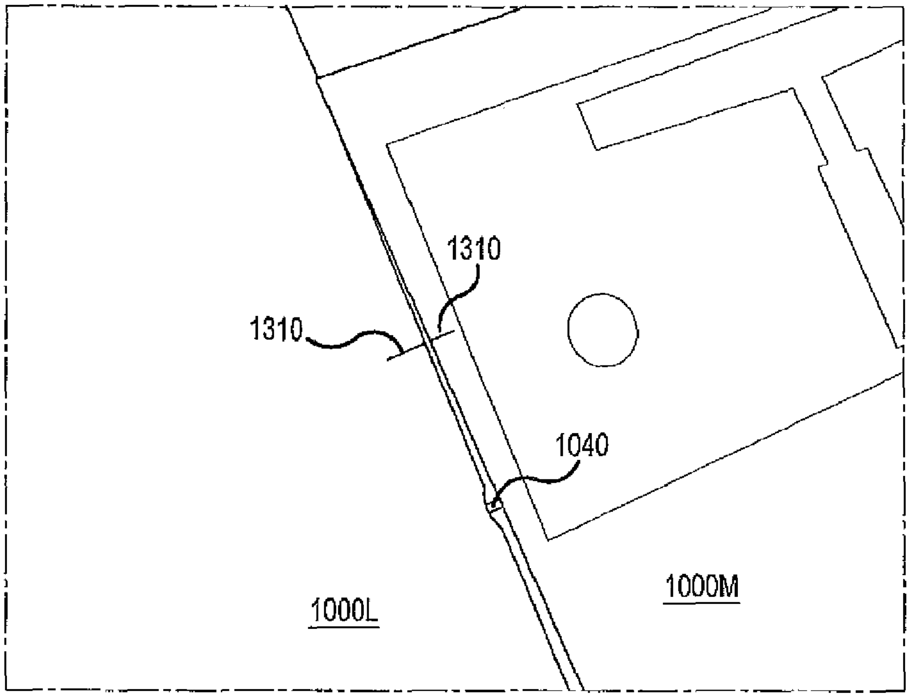
FIG. 5B shows a plan view of a portion of an exemplary embodiment of an elevator installation template which employs rigid corrugated sheet material.

FIG. 5A shows a highly schematic plan view of an exemplary embodiment of an elevator installation template 1000 which employs rigid sheet material. Various materials may be used, including plastic and metal, and may be a single thickness, or may be layered, and may include flutes, channels or corrugations. The exemplary embodiment of template 1000 shown in FIG. 5A has been made, e.g., cut, in three separate sections 1000A, 1000B and 1000C. Each section may be divided into subsections. FIG. 5A shows three subsections 1000A1, 1000A2 and 1000A3, for example. Although the shapes of these sections 1000A, 1000B and 1000C are rectangular, these sections, and any subsections, may have any reasonable geometric shape. As an aid in matching up template sections 1000A . . . x, lines 1110*a* and 1110*b*, etc., may be printed on the integral template 1000 before it is divided into individual sections A, B, C, and subsections, etc., wherein the lines 1110*a* and 1110*b*, etc., connect template structural feature indicia on different portions of the template 1000. For example, if the integral template 1000 is divided into, e.g., by being cut, three template subsections 1000A, 1000B and 1000C, the lines 1110 can be used as guides to assemble those three template sections 1000A-1000C in proper alignment. Lines 1110*a*-1110*c* are considered alignment indicia, and the invention contemplates using other alignment/correction indicia including, for example, edge marks 1310, which are shown, for example, in FIGS. 5B and 5C. Various means for connection the sections may be employed including, for example, rivets, bolts, tape, Velcro, pins, and adhesives FIG. 5B shows a plan view of a portion of an exemplary embodiment of an elevator installation template 1000 which employs rigid sheet material. Adjacent template sections 1000L and 1000M have edge alignment marks or indicia 1310 and are interconnected using elongated connectors, e.g., pins, 1040, which are sized and shaped to fit into the flutes or channels 1041 of the rigid corrugated sheet material which is shown as forming the template 1000.

Figure 5C:
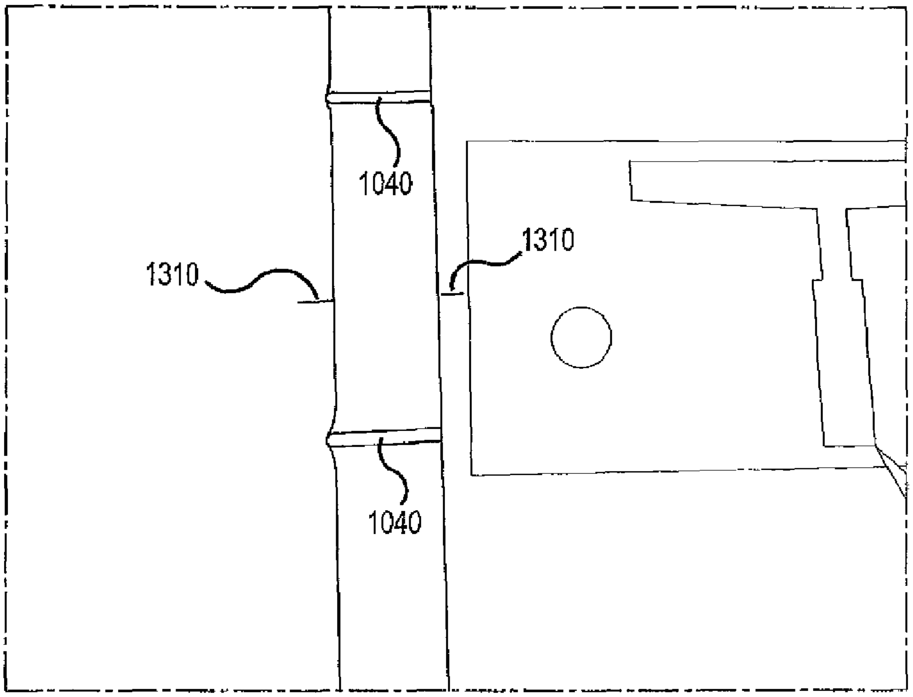
FIG. 5C shows a plan view of a partially assembled exemplary embodiment of an elevator installation template which employs rigid corrugated sheet material and connectors.

FIG. 5C shows another plan view of an exemplary embodiment of an elevator installation template 1000 which employs rigid corrugated sheet material and connectors, e.g., pins, 1040. In this exemplary embodiment, the two adjacent template subsections 1000L and 1000M are shown in partial assembly or disassembly, being separated from one another by crimped wire connectors 1040.

Figure 5D:
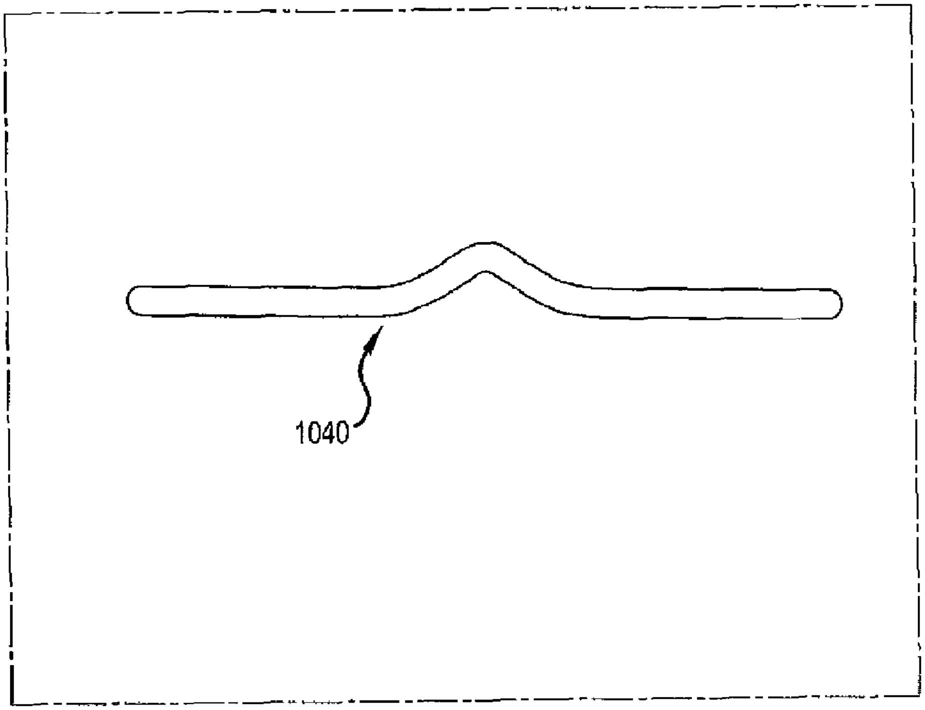
FIG. 5D shows a side view of a connector used to interconnect elevator template subsections made of rigid corrugated sheet material.

FIG. 5D is a side view of a connector used to interconnect elevator template sections made of rigid corrugated sheet material. In one exemplary embodiment, the connector 1040 is made of wire sized and shaped to fit into the flutes or channels 1140 of the rigid sheets of material used to make the template subsections 1000*x*. The connector 1040 has an enlarged portion 1041, e.g., a crimp, to ensure that it fits snugly inside of one template subsection, or adjacent rigid sheet material template subsections, and which prevents assembled template subsections from separating from one another. The connectors 1040 may be inserted partially or fully into each of the plural template subsections to keep the template subsections abutting one another or separated from one another at a fixed or variable distance from one another. Other connectors may also be used, including tape, clasps, clamps, Velcro, etc., for example, in lieu of, or in addition to, the elongated wire connectors 1040 shown.

Figure 5E:
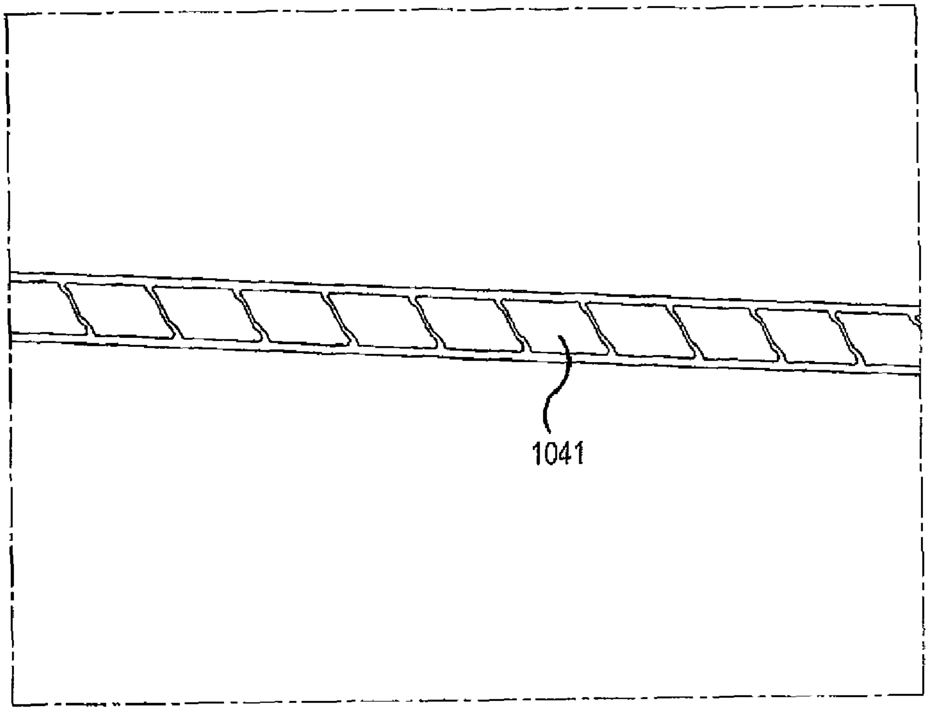
FIG. 5E shows a cross-sectional view of an elevator template section made of rigid corrugated sheet material.

FIG. 5E shows a cross-sectional view of an elevator template 1000 made of rigid corrugated sheet material, showing flutes or channels 1140.

Methods of making templates 1000 according to certain exemplary embodiments of this invention include starting with a rigid sheet of corrugated material, such as, for example, synthetic plastic polymer, including polyester polymer, and polypropylene, printing indicia therein using a suitable printing technique such as, for example, silk screen, intaglio, ink jet, or xerographic printing techniques, and stenciling. Connectors 1040 may be inserted in the flutes or channels 1041 of the corrugated rigid material to connect individual sections 1000A . . . x or subsections 1000*a*1 . . . x together into an integral template 1000. Additionally, although described as rigid, the corrugated material may be somewhat flexible.

Methods of using templates 1000 according to this invention comprise providing indicia on the template while it is in a single piece, dividing the template up into more than one section (or subsection) and assembling the sections and/or subsections together into a single integral template in or near the elevator shaft where the integral template 1000 is to be used, fastening the integral template 1000 to the hoistway, e.g., to the hoistway floor, checking the dimensions of the integral template 1000 for accuracy, fastening the template to the hoistway floor, marking and/or drilling holes in the floor for the floor mounted structural components or elements based on the integral template 1000 or template sections or subsections, setting up the laser or mechanical plumb lines and marking and/or drilling locations for wall mounted fasteners in the hoistway based on the integral template 1000 or template sections or subsections, fastening the structural elements in the hoistway based on the integral template 1000 or template sections or subsections, and holes prepared for the structural element supports, removing any template fasteners, disassembling the integral template 1000 or template sections 1000A . . . x if it is an assembly of different parts, removing the disassembled integral template 1000 from the elevator hoistway, and recycling the disassembled integral template 1000.

Figure 6:
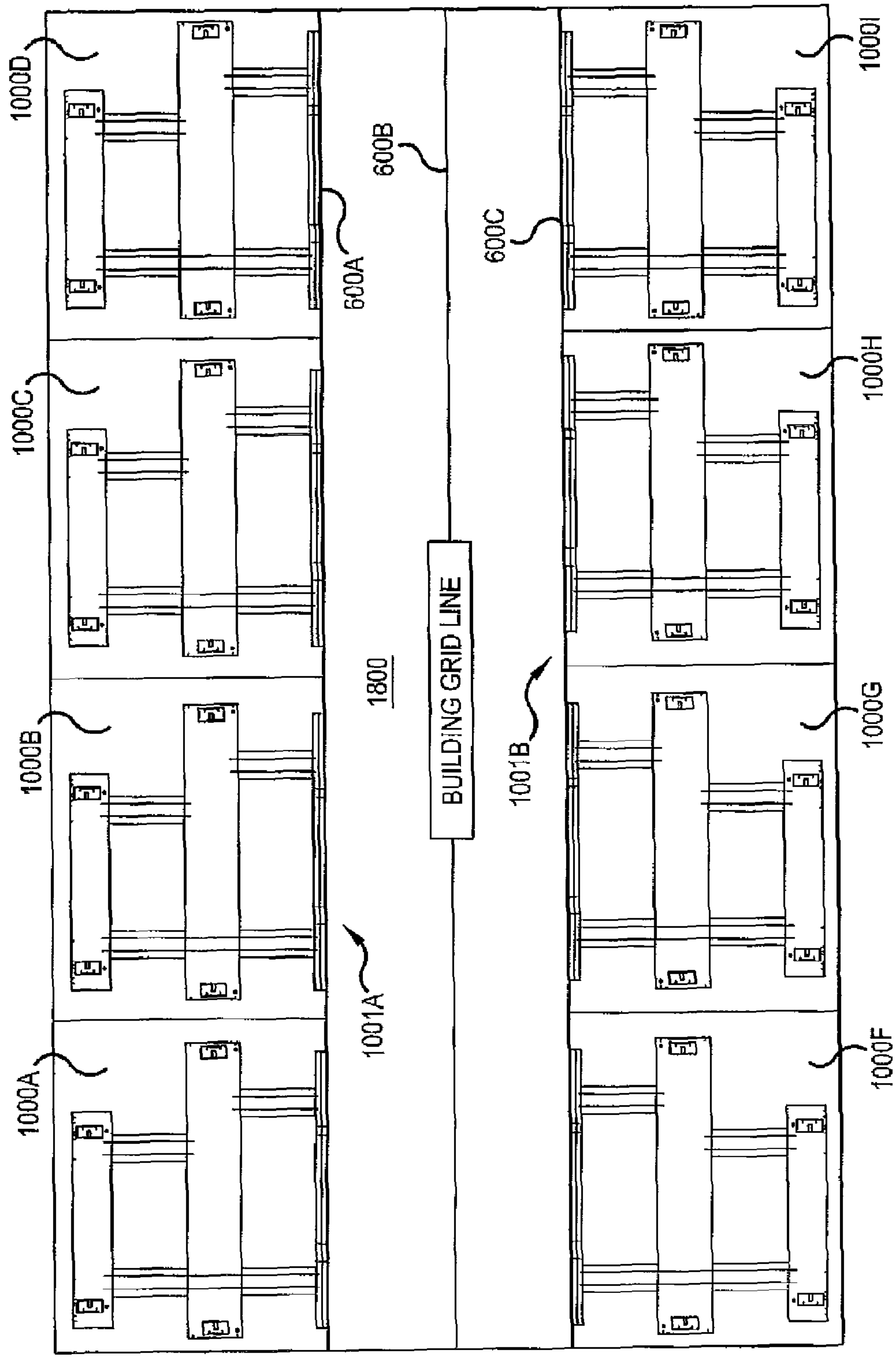
FIG. 6 is a plan view of a template arrangement for an elevator bank having a plurality of elevators, which may be referred to, for example, as a multiplex arrangement of elevators, so that the multiple elevators may be aligned to one or more building datum or grid lines by aligning plural templates with one another by use of a laser or a wire located across the front of a hoistway.

FIG. 6 shows two multiple elevator template configurations 1001A and 1001F, where multiple template configuration 1001A is made of four individual templates 1000A, 1000B, 1000C and 1000D, each of which can be a flexible or rigid template type, and where multiple template configuration 1001B is made of four individual templates 1000F, 1000G, 1000H and 1000I, each of which can be a flexible or a rigid template, located in an elevator bank 1800. The number of elevator hoistways or shafts in elevator bank 1800 may vary, although eight elevator shafts are shown in this exemplary embodiment. Fire compartmentalization between elevator hoistways or shafts is not shown, but may be employed, and even required. The multiple elevator templates may be aligned to building datum or grid lines 600A, 600B or 600C, for example, by use of a laser or a wire located across the front of a hoistway.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a template for use in accurately positioning elevator hoistway structural components, comprising:

forming a flexible sheet of material;

forming indicia on the flexible sheet of material which show locations of one or more elevator structural components which are to be installed in the elevator hoistway, and which show points of attachment of structural component support elements to the elevator hoistway; and squaring up the flexible sheet of material.

2. The method of making a template of claim 1, further comprising using one or more tensioning elements to square up the flexible sheet of material.

3. The method of making a template of claim 1, wherein the flexible sheet of material is squared up by being flattened using the tensioning elements.

4. The method of claim 1, wherein the indicia include fluorescent or phosphorescent material.

5. A method of using a flexible template to accurately position elevator hoistway major structural components, comprising:

placing a flexible template containing indicia showing installation positions of major structural components of an elevator system on the floor of the elevator hoistway;

squaring up the flexible template; and using the squared up flexible sheet of material located on the floor of the hoistway as a guide to install the major elevator structural components.

6. The method of using a flexible template of claim 5, further comprising using one or more tensioning elements to square up the flexible template.

7. A template for accurately positioning structural components of an elevator in an elevator hoistway, comprising:

a flexible sheet of material adapted to be placed on a floor of the elevator hoistway pit;

indicia on the flexible sheet of material which show locations of elevator structural components which are to be installed in the elevator hoistway, and which show points of attachment of structural component support elements to the elevator hoistway; and tensioning elements attachable to the flexible sheet of material to square up the flexible sheet of material.

8. A template for accurately positioning structural components of an elevator in an elevator hoistway and adapted to be placed on an elevator hoistway pit floor, comprising:

a sheet of material sized to cover a substantial portion of the hoistway floor;

indicia on the sheet of material which show locations of elevator structural components which are to be installed in the elevator hoistway, and which show points of attachment of structural component support elements to the elevator hoistway; and open areas in the template exposing areas of the elevator hoistway pit floor to permit a user of the template to position the template on the hoistway while standing on the elevator floor.

9. A template for accurately positioning structural components of an elevator in an elevator hoistway, comprising:

at least two separate rigid sheets of material adapted to be connected to one another to form a single template sized to cover a substantial portion of the hoistway floor;

indicia on the separate rigid sheets of material which show locations of elevator structural components which are to be installed in the elevator hoistway, and which show points of attachment of structural component support elements to the elevator hoistway; and indicia on the at least two rigid sheets of material to permit accurate interconnection of the at least two rigid sheets of material into the single template.

10. The template of claim 9, wherein the at least two rigid sheets are corrugated sheets.

11. A method of making a rigid template for use in accurately positioning elevator hoistway structural components, comprising:

forming indicia a rigid sheet of material substantially the size of an elevator hoistway floor which show locations of elevator structural components to be installed in the elevator hoistway, and which show points of attachment of structural component support elements to the elevator hoistway;

dividing the rigid sheet with indicia into plural sections;

connecting the rigid sheet sections together in the elevator hoistway to form an integral template.

12. A method of using a sectioned rigid integral template having indicia showing installation positions of major structural components of an elevator system to accurately position elevator hoistway major structural components, the hoistway having a floor, comprising:

assembling sections of the rigid integral template together into an integral template in an elevator hoistway;

placing the integral template to the hoistway floor placing a flexible template containing the indicia on the floor of the elevator hoistway;

securing the integral template to the floor; and using the secured integral template as a guide to install the major elevator structural components.

13. The rigid template of claim 11, further comprising a connector adapted to be inserted into corrugations of the corrugated sheets.

14. The rigid template of claim 13, wherein the connector is a wire.

15. The rigid template of claim 14, wherein the connector is a crimped wire.

16. A method of making a template for use in accurately positioning elevator hoistway walls of partitions in a building, comprising:

forming a flexible sheet of material;

forming indicia on the flexible sheet of material which show locations of one or more elevator hoistway walls or partitions which are to be installed in the building; and squaring up the flexible sheet of material.

17. A method of optimum positioning of multiple elevator hoistways in a building, comprising;

placing multiple elevator structural component location templates on a bottom floor of an elevator hoistway; and aligning the multiple elevator structural component location templates with respect to one another and with respect to a building gridline.

* * * * *